US012483129B2

(12) United States Patent
Khan et al.

(10) Patent No.: US 12,483,129 B2
(45) Date of Patent: Nov. 25, 2025

(54) CONTROL OF TWO-STAGE DC-DC CONVERTER

(71) Applicant: NXP USA, Inc., Austin, TX (US)

(72) Inventors: Nameer Ahmed Khan, Toronto (CA); Olivier Trescases, Toronto (CA); John Pigott, Phoenix, AZ (US); Hendrik Johannes Bergveld, Eindhoven (NL); Gerard Villar Piqué, Eindhoven (NL); Alaa Eldin Y El Sherif, Plano, TX (US)

(73) Assignee: NXP USA, Inc., Austin, TX (US)

( * ) Notice: Subject to any disclaimer, the term of this patent is extended or adjusted under 35 U.S.C. 154(b) by 193 days.

(21) Appl. No.: 18/129,312

(22) Filed: Mar. 31, 2023

(65) Prior Publication Data

US 2023/0318453 A1 Oct. 5, 2023

(30) Foreign Application Priority Data

Mar. 31, 2022 (EP) ..................................... 22165872

(51) Int. Cl.
*H02M 3/157* (2006.01)
*H02M 1/00* (2006.01)
*H02M 3/158* (2006.01)

(52) U.S. Cl.
CPC ......... *H02M 3/157* (2013.01); *H02M 1/0012* (2021.05); *H02M 1/008* (2021.05); *H02M 3/1582* (2013.01)

(58) Field of Classification Search
CPC ..... G05F 1/00; G05F 1/10; G05F 1/12; G05F 1/46; G05F 1/455; G05F 1/45;

(Continued)

(56) References Cited

U.S. PATENT DOCUMENTS 6,943,535 B1 * 9/2005 Schiff ................. H02M 3/1584
  323/244
7,808,225 B2 * 10/2010 Burdenski ........... H02M 3/1584
  323/350

(Continued)

FOREIGN PATENT DOCUMENTS

EP   1313195 A2 *  5/2003 ............. H02J 1/102
EP   3396837 A1    10/2018
WO   WO-2005096481 A1 * 10/2005 ............. H02M 3/04

OTHER PUBLICATIONS

Ashourloo, Mojtaba et al.; "Decentralized Quasi-Fixed-Frequency Control of Multiphase Interleaved Hybrid Dickson Converters for Fault-Tolerant Automotive Applications"; IEEE Transactions on Power Electronics, vol. 35. No. 7, Jul. 2020; 11 pages.

(Continued)

*Primary Examiner* — Sean Kayes
*Assistant Examiner* — Nusrat Quddus

(57) ABSTRACT

A method, power converter and controller are disclosed for controlling a power converter having a main converter connected between a first input voltage and a ground and having a main output at an output terminal, an auxiliary converter connected between a second input voltage and the ground and having an auxiliary output, an output capacitor connected between the main output terminal and a ground, and an auxiliary capacitor connected between the auxiliary output and the main output terminal; and a controller; the method comprising: operating the main converter at a first frequency, operating the auxiliary converter at a second (Continued)

frequency; controlling the main converter to control the voltage at the auxiliary output; and controlling the auxiliary converter to control the voltage at the main output.

20 Claims, 11 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H05B 39/048; B23K 11/24; H04B 2215/069

See application file for complete search history.

(56) References Cited

U.S. PATENT DOCUMENTS

| | | | |
|---|---|---|---|
| 8,441,242 B2 | 5/2013 | Ng et al. | |
| 9,086,708 B2 | 7/2015 | Tournatory et al. | |
| 9,547,322 B1* | 1/2017 | Tournatory | G05F 1/56 |
| 9,716,433 B2* | 7/2017 | Coleman | H02J 1/10 |
| 9,831,781 B2 | 11/2017 | Zhang et al. | |
| 10,050,559 B2 | 8/2018 | Li et al. | |
| 2009/0230930 A1* | 9/2009 | Jain | H02M 3/1588 323/234 |
| 2017/0085176 A1* | 3/2017 | Mathe | H02M 3/1584 |
| 2017/0207721 A1 | 7/2017 | Li | |

OTHER PUBLICATIONS

Chen, Chen et al.; "A 92.7%-Efficiency 30A 48V-to-1V Dual-Path Hybrid Dickson Converter for PoL Applications"; 2021 IEEE Energy Conversion Congress and Exposition, Oct. 2021, pp. 1989-1994.

Huang, Chien-Chun et al.; "Stacked Buck Converter: Current Ripple Elimination Effect and Transient Response"; Energies 2021, vol. 14, 64 No. 1; Dec. 2020.

Paek, Ji-Seon et al.; "An 88%-Efficiency Supply Modulator Achieving 1.08μs/V Fast Transition and 100MHz Envelope-Tracking Bandwidth for 5G New Radio RF Power Amplifier"; 2019 IEEE International Solid-State Circuits Conference; Feb. 2019; 3 pages.

Paek, Ji-Seon et al.; "An RF-PA Supply Modulator Achieving 83% Efficiency and-136dBm/Hz Noise for LTE-40MHz and GSM 35dBm Applications"; 2016 IEEE International Solid-State Circuits Conference; Feb. 2016; 3 pages.

Seo, Gab-Su et al.; "A 95%-Efficient 48V-to-1V/10A VRM Hybrid Converter Using Interleaved Dual Inductors"; 2018 IEEE Energy Conversion Congress Exposition; Sep. 2018; pp. 3825-3830.

Ma, Dajun et al.; "A Review of Voltage/Current Sharing Techniques for Series-Parallel-Connected Modular Power Conversion Systems"; IEEE Transactions on Power Electronics, vol. 35. No. 11, Nov. 2020; 18 pages.

Khan, Nameer et al.; "An Auxiliary-Assisted Dual-Inductor Hybrid DC-DC Converter with Adaptive Inductor Slew Rate for Fast Transient Response in 48-V Automotive PoL Applications"; 2022 IEEE 23rd Workshop on Control and Modeling for Power Electronics; Jun. 2022; 6 pages.

* cited by examiner

CONTROL OF TWO-STAGE DC-DC CONVERTER

CROSS-REFERENCE TO RELATED APPLICATIONS

This application claims the priority under 35 U.S.C. § 119 of European Patent application no. 22165872.7, filed on 31 Mar. 2022, the contents of which are incorporated by reference herein.

FIELD

The present disclosure relates to DC-DC converters and controllers and method of controlling DC-DC converters and in particular to converters having a main converter for providing the DC power at the output, together with an auxiliary converter for regulating transient power delivery.

BACKGROUND

A DC-DC converter normally includes a smoothing, or decoupling, capacitor across its output. In recent years, stringent transient requirements of Central-Processing-Unit (CPU) core voltages (0.8V-1.2V) have been met with large, costly electrolytic decoupling capacitors, presenting a challenge for applications which are cost-constrained or volume-constrained, such as automotive Electronic-Control-Unit (ECU) applications. Meanwhile, the proliferation of on-board electronics has resulted in a shift towards 48-V voltage-distribution networks. Both trends necessitate an efficient Point-of-Load (PoL) converter that can meet the power demands, in the order of 50 W, of automotive processors, from a wide-ranging bus voltage, which can typically be in the order of 24V-54V for automotive application. Hybrid converter topologies, used to enable converting a high input voltage to a low output voltage without the need of a transformer, and Gallium-Nitride (GaN) devices have enabled efficient 48-V PoL converters, however, fast transient response remains a challenge.

To improve transient response, control schemes employing low-cost auxiliary converters have been proposed where the DC-DC main stage delivers the DC steady-state and slowly changing load power, while the auxiliary stage provides and absorbs charge during load transients, thereby reducing decoupling capacitance requirements. However, transient response of auxiliary converters is constrained by the falling auxiliary inductor current slew rate. The slew rate, $m_f$ is defined by $m_f = -V_{OUT}/L_{AUX}$, where $L_{AUX}$ is the inductance of the auxiliary converter inductor and $V_{OUT}$ is the output voltage. Since $V_{OUT}$ is constrained due to the 1V output, the transient response can only be improved with smaller $L_{AUX}$, constraining achievable slew rates.

SUMMARY

According to a first aspect of the present disclosure, there is disclosed a controller for a power converter having a main converter connected between a first input voltage and a ground and having a main output at an output terminal, an auxiliary converter connected between a second input voltage and the ground and having an auxiliary output, an output capacitor connected between the main output terminal and the ground, and an auxiliary capacitor connected between the auxiliary output and the main output terminal; the controller comprising: a first control circuit configured to operate the main converter at a first frequency, a second control circuit configured to operate the auxiliary converter at a second frequency which is higher than the first frequency; the first control circuit being further configured to operate the main converter to control the voltage at the auxiliary output; and the second control circuit being further configured to operate the auxiliary converter to control the voltage at the main output. By controlling the main converter to regulate the voltage at the auxiliary output, the physical limit of the auxiliary LC filter imposed on the transient response is relaxed, since the auxiliary inductor current slew rate is determined by the voltage at the auxiliary output, rather than the main output. This may result in an improved transient response. Typically, the main converters and the auxiliary converter are both implemented as buck converters.

According to one or more embodiments, the second input voltage is equal to the first input voltage. The voltages may be supplied at or from the same supply or separately. However, in other embodiments, the auxiliary converter may use, as its supply a different voltage source, for instance it may use a different system supply such as 5V (in contrast with the 48V at the input of the main converter, as an example) in situations where that is available elsewhere in the system, or it could take a voltage tapped from, for example, the lowest voltage flying capacitor in the main converter when that is implemented as a hybrid stage.

According to one or more embodiments the second frequency is variable. It will be appreciated that the second frequency may change over time as a direct result of the control of the auxiliary or second converter. For example, in the case of hysteretic control the frequency may be not fixed; the same is the case for "constant on-time" or "peak-current" control as will be familiar to the skilled person. In addition to this, the operating frequency (or range of frequencies within which the converter operates) may be reduced, for example where in circumstances in which few load transients or load steps are expected. In some circumstances the auxiliary converter could even be halted, for example where the load current is well controlled and does not vary fast. In such circumstances the controller may adjust, or alter, the switching frequency.

According to one or more embodiments the first control circuit comprises an adaptive-voltage-positioning control (AVP) subcircuit. By using a type of adaptive-voltage-positioning control, the slew rates of the auxiliary voltage may be further adjustable based on the load currents. This may enable, for example, use of a smaller capacitor on the auxiliary output, and/or lower RMS current in the auxiliary converter and/or lower peak current in the main converter.

According to one or more embodiments the AVP subcircuit is configured to measure a current output from the main converter, or the load current directly, adapt an auxiliary reference voltage output in dependence on the current output, and the first circuit is configured to control the voltage at the auxiliary output to the adapted auxiliary reference voltage. In one or more other embodiments, the AVP subcircuit is configured to measure a current through an inductor in the main converter, adapt an auxiliary reference voltage output in dependence on the current through the inductor, and the first circuit is configured to control the voltage at the auxiliary output to the adapted auxiliary reference voltage.

According to one or more embodiments the second controller is configured to use hysteretic control to control the voltage at the main output. According to one or more embodiments the second control circuit is configured to: determine an error between the voltage at the main output and a reference output voltage, and control switches in the auxiliary converter to minimise the error. In particular, according to embodiments the second circuit controls the switches to adjust a duty cycle of the half-bridge node in the auxiliary converter, in order to minimise the error.

According to one or more embodiments the auxiliary converter is an AC-coupled buck converter. A simple AC-coupled buck converter has a particularly low component count. According to one or more embodiments the AC-coupled buck converter comprises a pair of switches connected in series between the second input voltage and the ground and having a node therebetween, and an inductor connected between the node and the auxiliary output.

According to one or more embodiments the main converter is a dual-inductor hybrid converter. Where a dual-inductor hybrid converter is used as the main converter the switched-capacitor stage ratio, also known as native conversion ratio, may be chosen to be 4:1 or another convenient value According to a second aspect of the present disclosure, there is provided a power converter comprising the controller as just discussed, the main converter and the auxiliary converter. The power switches for the power converter, or some components may be provided on a single chip or in a single package. Alternatively, discrete components may be used for the switches. A range of technologies may be used for the switches including silicon, GaAs, GaN, etc., depending on the application.

According to a further aspect of the present disclosure, there is provided a method of controlling a power converter having a main converter connected between a first input voltage and a ground and having a main output at an output terminal, an auxiliary converter connected between a second input voltage and the ground and having an auxiliary output, an output capacitor connected between the main output terminal and the ground, and an auxiliary capacitor connected between the auxiliary output and the main output terminal; and a controller; the method comprising: operating the main converter at a first frequency, operating the auxiliary converter at a second frequency; controlling the main converter to control the voltage at the auxiliary output; and controlling the auxiliary converter to control the voltage at the main output. Typically, the main converters and the auxiliary converter are both implemented as buck converters.

According to one or more embodiments the second input voltage is equal to the first input voltage. According to one or more embodiments the second frequency is variable.

According to one or more embodiments controlling the main converter to control the voltage at the auxiliary output comprises adaptive-voltage-positioning control (AVP).

According to one or more embodiments the AVP control comprises measuring a current output from the main converter, adapting an auxiliary reference voltage output in dependence on the current output, and controlling the voltage at the auxiliary output to the adapted auxiliary reference voltage. According to one or more embodiments, the reference voltage may be adaptable by more than 100%, and even more than 300% of its minimum value. Such adaptive-voltage-positioning control may be referred to as extreme adaptive-voltage-positioning.

According to one or more embodiments controlling the auxiliary converter to control the voltage at the auxiliary output comprises: determining an error between the voltage at the main output and a reference output voltage, and controlling switches in the auxiliary converter to minimise the error.

According to one or more embodiments the auxiliary converter is an AC-coupled buck converter. According to one or more embodiments the AC-coupled buck converter comprises a pair of switches connected in series between the second input voltage and the ground and having a node therebetween, and an inductor connected between the node and the auxiliary output.

According to one or more embodiments the main converter is a dual-inductor hybrid converter.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read-only memory (ROM), erasable programmable read-only memory (EPROM) or electronically erasable programmable read-only memory (EEPROM), as non-limiting examples. The software implementation may be an assembly program.

The computer program may be provided on a computer readable medium, which may be a physical computer readable medium, such as a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
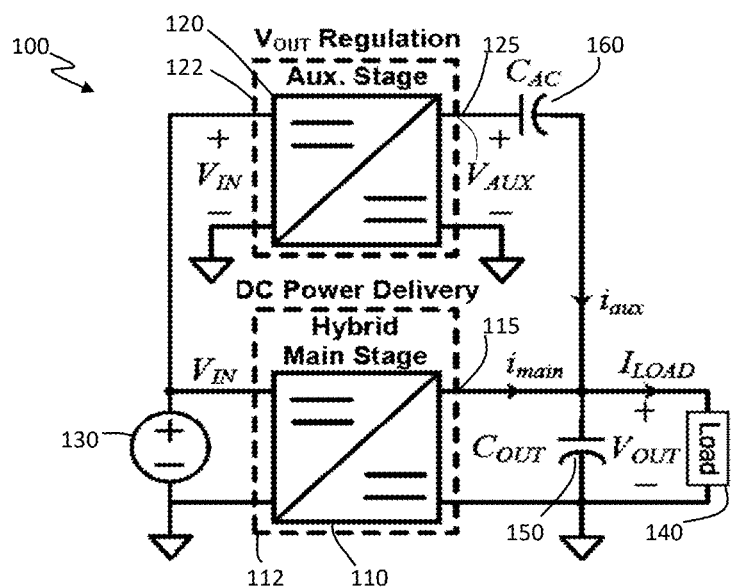
FIG. 1 illustrates, schematically, a DC-DC converter architecture comprising a main converter and an auxiliary converter.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

FIG. 1 illustrates, schematically, a DC-DC converter architecture 100 comprising a main converter 110 and an auxiliary converter 120. Each stage is connected to a DC power supply 130 which provides an input voltage $V_{IN}$ which, in the case of an automotive application may typically vary over a wide range such as 24 to 56V. The main converter 110, which may also be described as a main stage, provides, at its output 115 a current output $i_{main}$ to the output load 140, across which is connected an output capacitor $C_{OUT}$ 150. The auxiliary converter 120, which may also be referred to as an auxiliary stage, is also connected to the input voltage $V_{IN}$, and provides an output voltage $V_{AUX}$. This output is connected to the load through an output coupling capacitor $C_{AC}$ 160 and provides an auxiliary current to the output $i_{aux}$. The total current, $I_{LOAD}$, provided to the load 140 is thus defined by $I_{LOAD}=i_{main}+i_{aux}$. Thus, according to this architecture, primary DC power delivery 112 is provided by the main converter 110 and $V_{OUT}$ regulation 122 is provided by the auxiliary converter 120. It will be appreciated that the main converter is typically a buck converter, as is, typically, the auxiliary converter.

Figure 2:
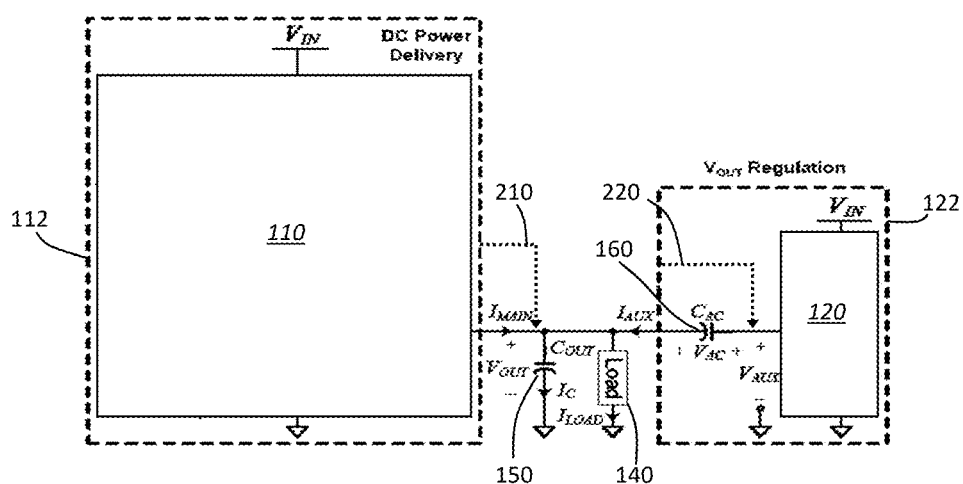
FIG. 2 shows conventional control of the DC-DC converter architecture of FIG. 1.

Turning now to FIG. 2, this shows conventional control of the DC-DC converter architecture of FIG. 1. The architecture is the same with main converter 110 providing DC power delivery 112 and an auxiliary converter 120 providing a $V_{OUT}$ regulating output 122. However, on this figure the control of each converter is shown schematically: the main converter 110 is controlled according to the voltage $V_{OUT}$ at its output, as illustrated by dotted control line 210. Similarly, the auxiliary converter 120 is controlled according to its output $V_{AUX}$, as shown by dotted line 220. Alternatively, both the main converter 110 and the auxiliary converter 120 may control $V_{OUT}$, where bandwidth separation is applied to prevent stability problems, while the auxiliary converter also controls $V_{AUX}$, for example by ensuring that the DC current through $C_{AC}$ is zero.

Figure 3:
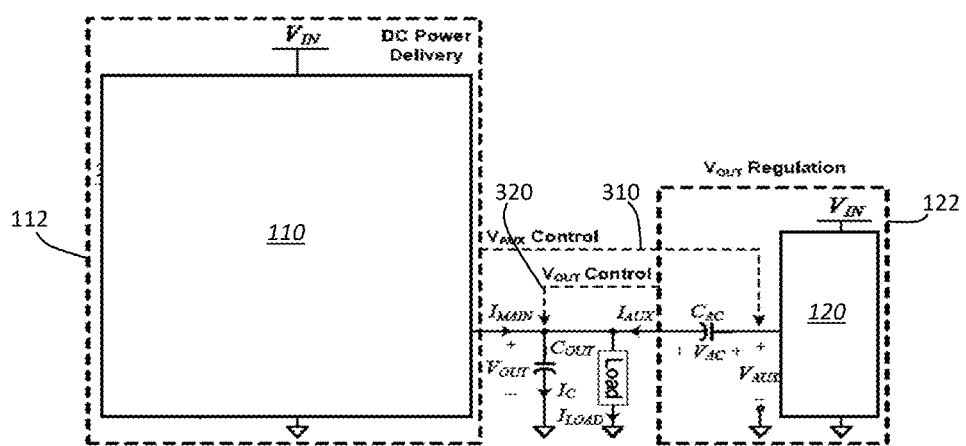
FIG. 3 shows control of the DC-DC converter architecture of FIG. 1 according to one or embodiments of the present disclosure.

Turning now to FIG. 3, this shows control of the DC converter architecture of FIG. 1 according to embodiments of the present disclosure. Thus there is provided a control scheme in which the AC-coupled auxiliary converter 120 regulates the output voltage, $V_{OUT}$, while the main converter 110 regulates the auxiliary capacitor voltage, $V_{AUX}$, as shown in FIG. 3. This is shown by the dotted lines 310 according to which the main converter 110 regulates the voltage $V_{AUX}$ at the output of the auxiliary converter, and dotted line 320 according to which the auxiliary converter 120 regulates the voltage $V_{OUT}$ at the output of the main converter (and thus across the load). In a conventional converter, the slew rate $m_f$, for a transient response is determined by $V_{OUT}$. But regulating $V_{AUX}$, the physical limit of the auxiliary LC filter imposed on the transient response is removed since the auxiliary inductor current slew rate, $m_f$, is determined by $V_{AUX}$, rather than $V_{OUT}$. (Note that $V_{AUX}$ is generally much larger than $V_{OUT}$, for instance, in a typical application it could be $V_{IN}/2$. Faster slew rates, both positive-going and negative-going, may then be achievable). Furthermore, as will be described in more detail hereinbelow, according to one or more embodiments a variant of adaptive-voltage-positioning (AVP) control, which may be termed Extreme Adaptive Voltage Positioning (EAVP) of $V_{AUX}$ is also introduced to dynamically set the slew rate, $m_f$, of the inductor of the auxiliary converter 120 based on the load current, $I_{LOAD}$, to enable use of a reduced auxiliary capacitance, $C_{AC}$, and possibly a reduced auxiliary rms current, $i_{aux,rms}$, or a reduced peak main-stage current, $i_{main,pk}$. The skilled person will appreciate that the EAVP may alternatively be implemented based on the main converter current, $I_{MAIN}$.

Figure 4:
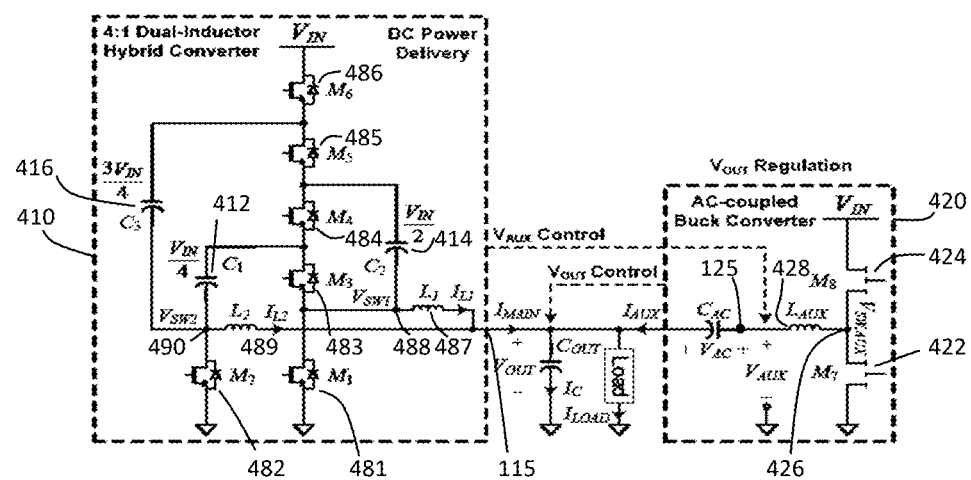
FIG. 4 shows a DC-DC converter according to one or more embodiments.

Before discussing the control in more detail, consider first the example two-stage converter shown in FIG. 4. This shows a DC-DC converter configured to operate according to one or more embodiments. In this example a hybrid dual-inductor converter, in particular a 4:1 dual-inductor hybrid converter 410 is implemented as the main converter. Dual-Inductor Hybrid (DIH) converters can provide high conversion ratios, and have additional advantages of inherent current sharing, and high output-current capability, which makes them particularly suited for a high voltage conversion ratio at a relatively low switching frequency and hence relatively high efficiency. As will be familiar to the skilled person, the 4:1 dual-inductor hybrid (DIH) converter comprises three flying capacitors C1 412, C2 414 and C3 416, which are connectable in various combination across the input voltage by means of switches M1, M2 ... M6 (481, 482 ... 486). A first inductor L1 487 is connected between a first switch node $V_{SW1}$ 488 (between M1 481 and M3 483) and the output 115, and a second inductor L2 489 is connected between a second switch node $V_{SW2}$ 490 and the output 115.

Figure 5:
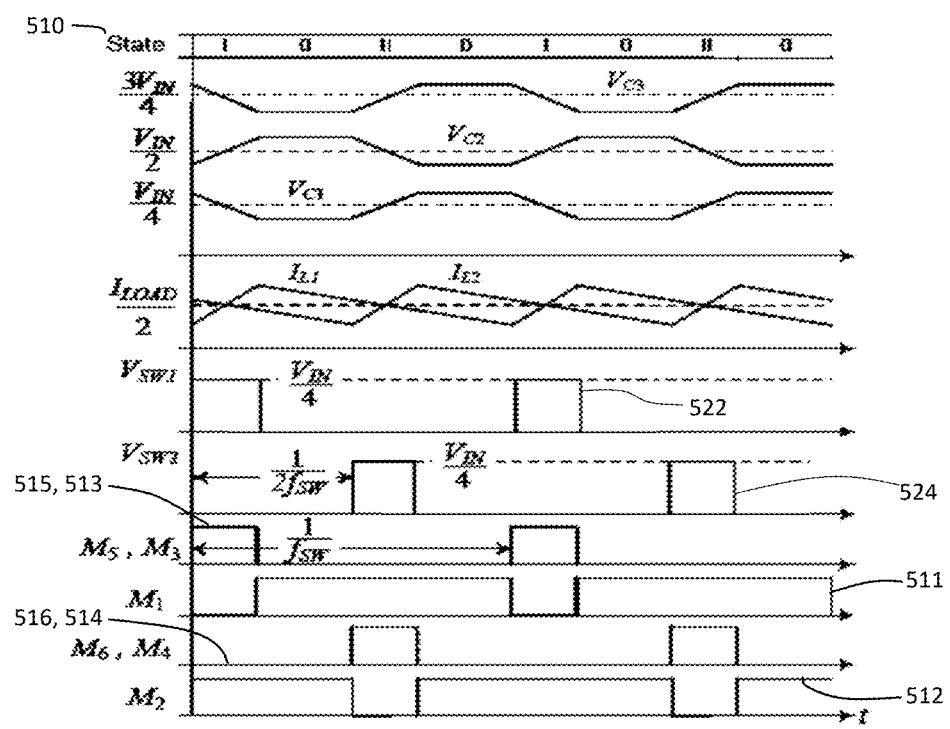
FIG. 5 shows a switching sequence of a main converter as shown in FIG. 4.

FIG. 5 shows the switching sequence of such a 4:1 DIH shown in FIG. 4. The converter alternates between two charging states I and II, and between each is a discharging period (state 0), as shown at 510. The statuses (511, 512 ... 516) of the switches M1, M2 ... M6, and the voltage 522 $V_{SW1}$ across the first switch node and the voltage 524 $V_{SW2}$ across the second switch node are shown in the lower plots resulting in charging and discharging of the three flying capacitors C1, C2 and C3, with charge voltages $V_{C1}$, $V_{C2}$ and $V_{C3}$ across them as shown in the upper plot. As can be seen, the voltage across C1 oscillates around $V_{IN}/4$, the voltage across C2 oscillates around $V_{IN}/2$ (that is to say, $2V_{IN}/4$), and the voltage across C3 oscillates around $3V_{IN}/4$. The currents $I_{L1}$ and $I_{L2}$, in inductors L1 487 and L2 489, build up during the respective state I and state II charging periods, and relax during the other charging state and the discharge state 0, to result in a constant $I_{LOAD}$, where $I_{L1}+I_{L2}=I_{LOAD}$.

Returning to FIG. 4, the auxiliary stage 420 is an AC-coupled Buck (ACB) converter stage configured as a simple half-bridge, having a pair of switches M7 422 and M8 424 with a switch node 426 therebetween, and an inductor $L_{AUX}$ 428 connected between the switch node and the auxiliary converter output node 125. The auxiliary converter 420 is designed to operate at relatively high frequency in order to provide a fast response to transients. An AC-coupled Buck (ACB) converter has a low component count, so is a suitable choice, although in other embodiments different architectures may be used. Note that although the auxiliary converter shows a series connection of $C_{AC}$ and $L_{AUX}$, this is not operating as an LC-resonant converter: as the skilled person would appreciate, the coupling capacitor $C_{AC}$, in the present architecture has a significantly larger capacitance (of the order of a tens of μF) than would be required for a resonant stage (for which the capacitance may be of the order of 10 to ~100 nF), leading to a much slower voltage variation than it would have in resonance with $L_{AUX}$. Instead, the voltage on $C_{AC}$ is regulated by the main stage to generate an offset voltage and improve the transient response of the auxiliary stage. In the present instance, the value of the coupling capacitor depends on the auxiliary voltage reference. As a non-limiting example, if the auxiliary voltage reference is set to $V_{IN}/2$, the coupling capacitor will typically be in range of around 20 μF to around 40 μF. Whereas, if the auxiliary voltage reference is set to $V_{IN}/6$, then the capacitance increases to 100 μF or more, to limit the swing during load transients.

It will be appreciated that the embodiments are not limited the 4:1 DIH shown in FIG. 4, and in particular various hybrid topologies may be used instead, whilst still providing that the converter may be optimized for efficiency by having an appropriately chosen low frequency to enable delivering the DC power and slow transient changes. Moreover, the main converter does not need to be a hybrid one and could be a non-hybrid DC-DC converter stage that processes the bulk of the power with a moderate voltage conversion ratio. The present disclosure is illustrated by the hybrid main converter stage shown and an 48V system since there are mainly applications with sub-1V processors that need to be supplied from a 48V bus, for instance in the field of automotive, and data centres, but the present disclosure is not limited thereto.

Figure 6:
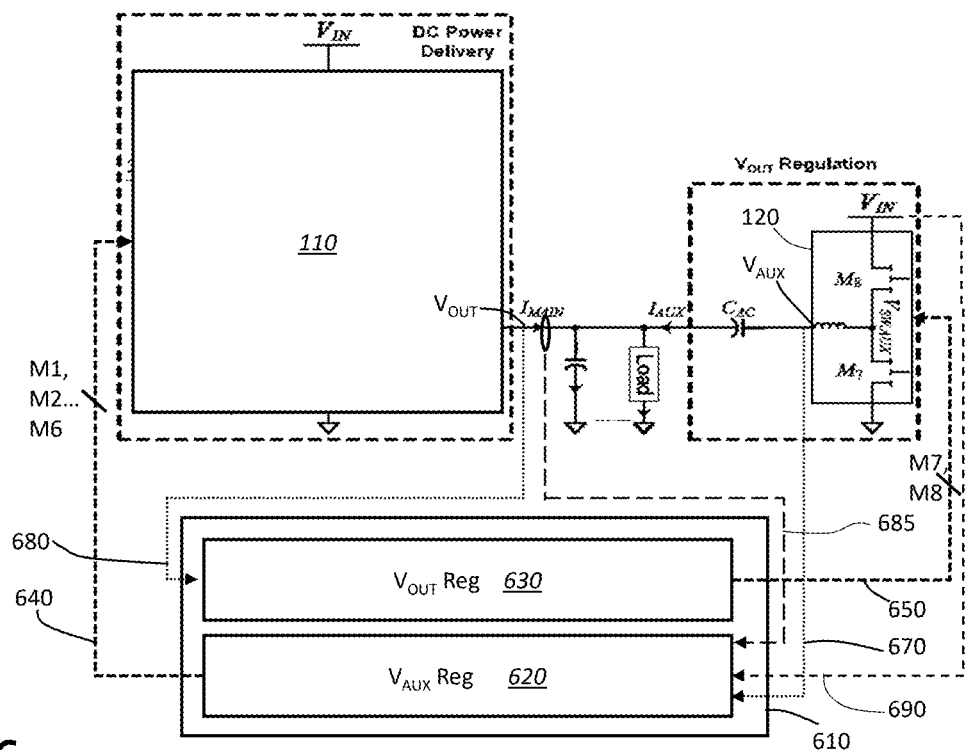
FIG. 6 shows the DC-DC converter of FIG. 3, including a controller.

FIG. 6 shows the DC-DC converter of FIG. 3, including a controller 610. Note that the controller may be part of the converter or may be separate. For instance it may form part or the whole of a controller chip or controller integrated circuit (IC), or may be part of a more complex IC, such as a microprocessor. The controller 610 comprises a first control circuit, 620, configured to operate the main converter at a first frequency (as shown by output signals 640 from the controller to the main converter, for controlling the switching of switches M1, M2 . . . M6), and a second control circuit 630 configured to operate the auxiliary converter at a second frequency which is generally higher than the first frequency (as shown by output signals 650 from the controller to the auxiliary converter, for controlling the switching of switches M7, M8); the first control circuit 620 being further configured to operate the main converter to control the voltage at the auxiliary output; and the second control circuit being further configured to operate the auxiliary converter to control the voltage at the main output. As already mentioned, the phrase "operated at a frequency" as used herein does not constrain the control to a specific frequency. In particular the converter is not constrained to fixed-frequency, or PWM, control. Rather, the phrase is to be interpreted broadly as indicating a frequency (or range of frequencies), indicative of the switching, such as "about 1 MHz", or "about 50 kHz". The first circuit thus senses, as shown at 670, the voltage $V_{AUX}$, as will as the input voltage $V_{IN}$ shown at 690. The second circuit senses as shown at 680, the voltage $V_{OUT}$. As shown at 685, the current $I_{MAIN}$ output from of the main converter may also be measured, and used for adaptive-voltage-positioning (AVP) control in the first control circuit ($V_{AUX}$ Regulation of the main converter) 620. It will be appreciated that, instead of measuring $I_{MAIN}$ itself, an accessible proxy, or representative, current may be measured including the load current itself. For example, in some embodiments, it may be convenient to measure a Sample-and-Hold (S/H) current in a high-side switch of the main power converter, or the current through one of the inductors in the main converter, in the case that the main converter is a DIH converter.

Figure 7:
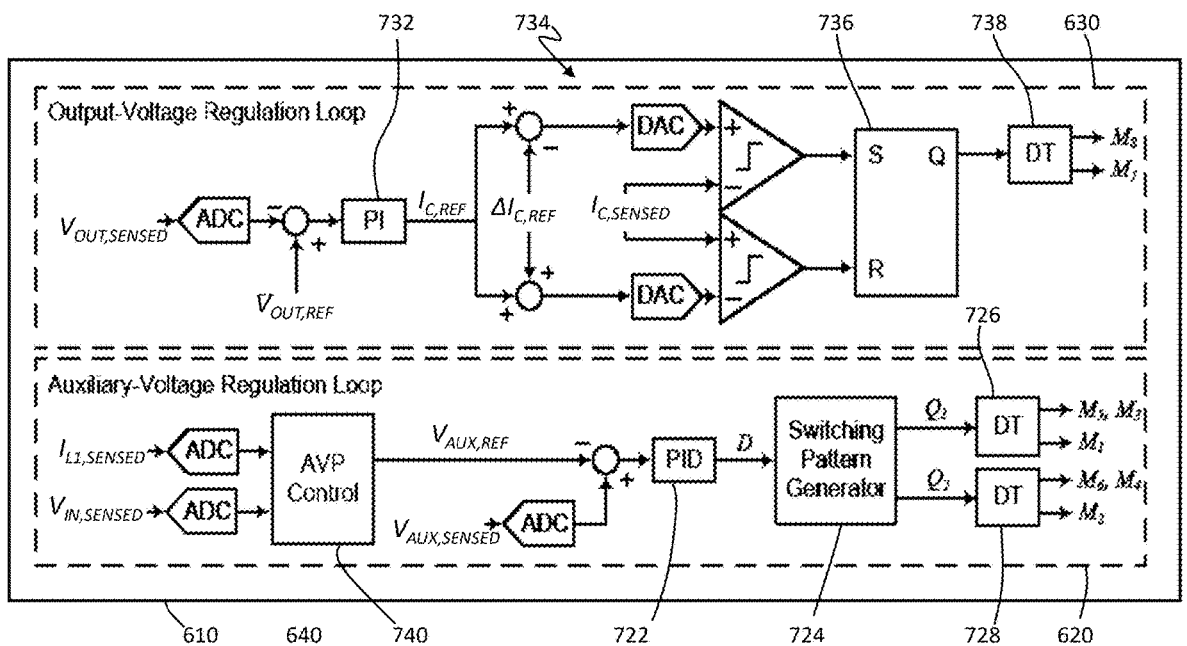
FIG. 7 shows control loops implemented by the first and second circuits of a controller as shown in FIG. 6.

FIG. 7 shows in more detail the control loops implemented by the first circuit 620 and the second circuit 630 of the controller 610. First circuit 620 implements the auxiliary-voltage regulation loop, and controls the main converter switches, and second circuit 630 implements the output-voltage regulation loop and controls the auxiliary converter switches. Optionally, and according to one or more embodiments, first circuit 620 includes a form of adaptive-voltage-positioning (AVP) control as will be described in more detail hereinbelow.

Considering first the output-voltage regulation loop implemented by the second circuit 630, this controls the auxiliary converter switches M7 422 and M8 424. The auxiliary, in this case ACB, converter regulates the output voltage $V_{OUT}$, in this case based on an output-capacitor $C_{OUT}$ current-based Hysteretic-Current Mode-Control (HCMC) scheme, as shown in FIG. 7, although other regulation schemes may be used, as will be familiar to the skilled person. The sensor output voltage $V_{OUT}$ is digitised and then compared with a reference output voltage $V_{OUT,REF}$, resulting in an error signal which is integrated in a PI (proportional-integrating) integrator 732 to provide a signal $I_{C,REF}$. The signal is part of the hysteretic controller 734 which compares it with the hysteretic limit $\Delta I_{C,REF}$, to determine when to send control signals to the power stage. The control signals are passed to a set reset (SR) flip-flop 736, whose output is processed through a non-overlap timer 738, also known as a dead-time (DT) block timer (in order to avoid shoot-through current which could otherwise result from simultaneous turn-on of the switches, for instance resulting from finite slew rates of the switches). Outputs of the non-overlap timer 738 are provided to control the switches and M7 and M8. It will be apparent to persons skilled in the art that other controller implementations, also those entirely implemented in the analog domain, are possible.

Turning next to the auxiliary-voltage regulation loop implemented by the first circuit 620, as already mentioned in this example it includes an AVP control subcircuit 740. The sensed auxiliary converter input voltage $V_{IN,SENSED}$ (in line with the embodiment of FIG. 6, the main converter and the auxiliary converter are both powered by the same $V_{IN}$. If a separate input voltage is used for the auxiliary converter, that input voltage should be sensed and used as input $V_{IN,sensed}$ to controller 620) and a main converter inductor current $I_{L1,SENSED}$ are provided as inputs to the AVP control subcircuit. The current output from the main converter ($I_{MAIN}$) could, at least in theory, be used instead of $I_{L1,SENSED}$, as shown in FIG. 6. However, in practical implementations, it is generally more convenient to directly measure the current in one of the inductors (in embodiments having a DIH main converter such as that shown in FIG. 4) The inputs are digitised and passed to the AVP control subcircuit 740. This provides a reference signal $V_{AUX,REF}$, which is compared to a digitised version of the sensed voltage $V_{AUX,SENSED}$, to generate an error signal which is integrated in a PID (proportional-integrator-differentiator) unit 722, to provide a drive signal D which is passed to a switch pattern generator 724 which outputs two timing signals Q1 and Q2. These in turn are processed by non-overlap, or dead-time (DT), timers 726 and 728 to result in the switching controls for the switches M1, M2 . . . M6 in the 4:1 dual-inductor hybrid main converter 410. It will be apparent to persons skilled in the art that other controller implementations, also those entirely implemented in the analog domain, are possible.

The (E)AVP control subcircuit will be considered in more detail, below, with reference to FIG. 9.

Figure 8:
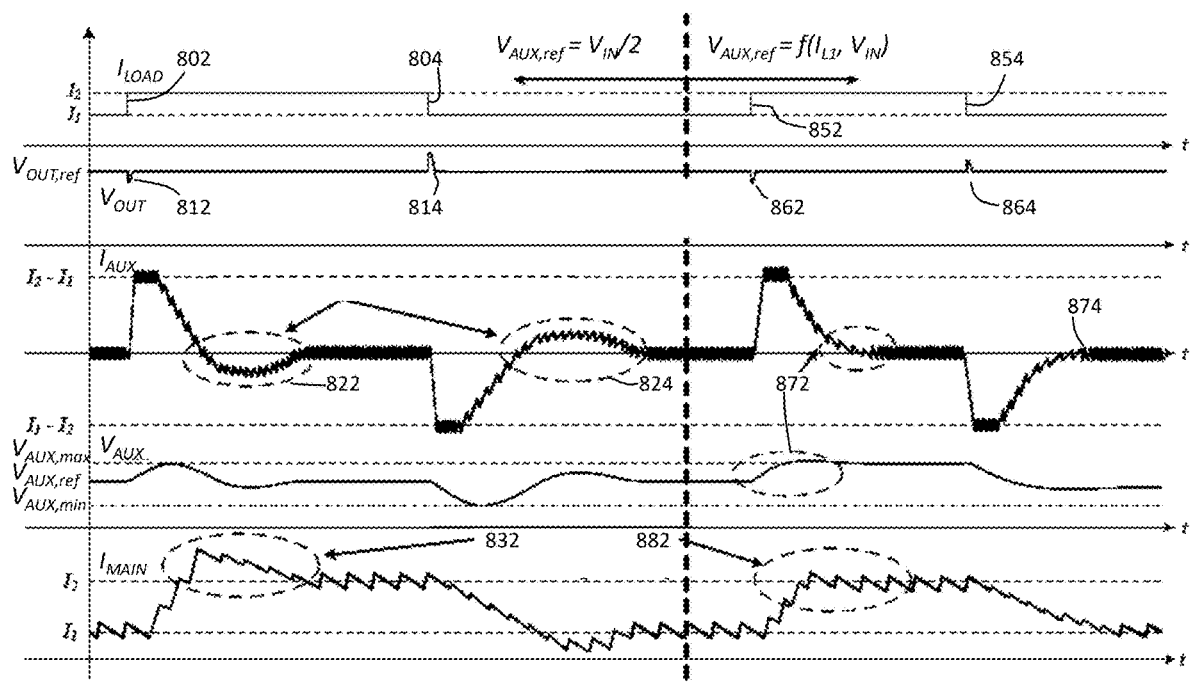
FIG. 8 shows various operating signals of a converter resulting from load transients, with and without AVP control.

The control, both with and without the inclusion of AVP control will now be discussed with reference to FIG. 8. The auxiliary, ACB, converter responds to disturbances in the output capacitor current, IC, by ensuring $I_{AUX}=\Delta I_{LOAD}$, which minimizes the charge drawn from $C_{OUT}$ (and therefore voltage excursion on $V_{OUT}$). Since $I_{AUX}=\Delta I_{LOAD}$, the auxiliary voltage, $V_{AUX}$, begins to deviate due to the charge accumulating (or depleting) on $C_{AC}$, as shown in FIG. 8.

Unless the average value of $I_{AUX}$ is zero, that is to say, $\langle I_{AUX}\rangle=0$, $V_{AUX}$ continues to deviate until $V_{IN}$ (the input voltage of the auxiliary converter) or 0 V is reached at which point the ACB cannot regulate $V_{OUT}$. Thus, a mechanism is required to ensure $\langle I_{AUX}\rangle=0$ in steady-state, which, with the ACB, is equivalent to the DC regulation of $V_{AUX}$, as given by:

$$\langle I_{AUX}\rangle - \langle I_{C_{AC}}\rangle = C_{AC} \cdot \frac{dV_{AC}}{dt} = C_{AC} \cdot \left(\frac{dV_{AUX}}{dt} - \frac{dV_{OUT}}{dt}\right) = 0 \quad (1)$$

With the auxiliary converter regulating $V_{OUT}$, the main converter regulates $V_{AUX}$ to ensure $\langle I_{AUX}\rangle=0$ in steady state, as shown in FIG. 7.

Since the auxiliary converter ACB performs the fast transient regulation, the DIH switching frequency, $f_{SW,DIH}$, can be optimized for DC power efficiency by selecting reliable low-cost silicon devices with low $R_{DS,ON}$ for M1, M2 ... M6. Typical switching frequencies $f_{SW,DIH}$, for the main converter may conveniently be in a range of 50 kHz to 500 kHz, or more particular in a range from 100 kHz to 250 kHz. Similarly, the auxiliary converter has zero average output current and thus have low $R_{DS,ON}$ losses which allows for the use of devices with low gate charge ($Q_G$) to minimize switching losses. It will be appreciated that the transistors M7, M8 are each required to block the whole input voltage $V_{IN}$. High-voltage transistors, and in particular high-voltage transistors with low leakage currents, such as GaAs or even better wide-band-gap GaN devices, may thus be best suited to minimize the losses of the ACB, while increasing $f_{SW,ACB}$ to approximately 10×$f_{SW,DIH}$. The auxiliary converter switching frequency $f_{SW,ACB}$ may thus conveniently be in a range of 500 kHz to 5 MHz, or more particularly in a range of 1 MHz to 2.5 MHz.

FIG. 8 show the response to a transient in the load current $I_{LOAD}$, according to two embodiments. On the left-hand side is shown the response using control without AVP and on the right-hand side is the response using a variant of AVP. As will be seen, with the operation of two simultaneous control loops, attention should be given to the design of key parameters to avoid instability. During load changes such as the transient (shown at 802, 804, 852 and 854), the change in $V_{OUT}$ is:

$$\Delta V_{OUT} = \frac{1}{2} \cdot \frac{\Delta I_{LOAD}^2}{m_f \cdot C_{OUT}} \quad (2)$$

where $m_f$ is defined as the falling ACB inductor current slew rate, $m_f=-V_{AUX}/L_{AUX}$.

This can be seen at 812 and 814. With the ACB, $m_f$ depends on $V_{AUX}$ and its DC regulation allows for dynamic control of $m_f$. Thus, the slew rate, $m_f$, increases by a factor of $V_{AUX}/V_{OUT}$ for a given $L_{AUX}$, which allows a reduced $C_{OUT}$, in comparison with the conventional case mentioned in the introduction for which $m_f=-V_{OUT}/L_{AUX}$. Based on (2), the selection of $V_{AUX,ref}$ determines the ACB transient response. For instance, $V_{AUX,ref}=V_{IN}/2$ would equalize the on-times of M7 and M8 for high $f_{SW,ACB}$ and consequently, faster response times and lower $\Delta I_{AUX}$. For $V_{AUX,ref}=V_{IN}/2$, the ACB conversion ratio is, in practical applications, constrained to approximately $\frac{1}{4}<V_{AUX}/V_{IN}<\frac{3}{4}$, which corresponds to a maximum deviation of $\Delta V_{AUX,max}=V_{IN}/4$. One drawback of a constant $V_{AUX,ref}$ is the additional charge $I_{AUX}$ must supply or sink to ensure $V_{AUX}=V_{AUX,ref}$ as shown at 822 and 824 in FIG. 8. However, by using an AVP load line, as shown in FIG. 9, the additional restoration charge transfer following a load step is no longer required, as shown on the right-hand side of FIG. 8 at 872, 874. This reduces $I_{AUX,rms}$ and the peak current $I_{MAIN,pk}$ in the main converter, as can be seen by comparing 882 with 832. The transient on the output voltage $V_{OUT}$ is thus reduced, as shown at 862 and 864 for the load steps 852 and 854. It will be appreciated that in this control loop, the voltage is allowed to deviate further from its nominal value, than is typically the case in conventional AVP control: this variant may thus be termed "extreme adaptive-voltage-positioning", although the qualitive concept is the same.

The capacitance value for $C_{AC}$ should be chosen to maintain $\Delta V_{AUX}$ within reasonable limits. Since the ACB must provide $\Delta I_{LOAD}$ for at least $T_{SW,DIH}$, $C_{AC,min}$ is given by:

$$C_{AC,min} = \frac{\Delta I_{LOAD}}{\Delta V_{AUX}} \cdot T_{SW,DIH} \quad (3a)$$

and $$C_{OUT,min} = \frac{1}{2} \cdot \frac{\Delta I_{LOAD}^2}{\Delta V_{OUT,max}} \cdot \frac{L_{AUX}}{V_{AUX}} \quad (3b)$$

Based on (3a), an example case can be simulated, according to the following, illustrative, parameters:

| | |
|---|---|
| Input Voltage, $VI_N$ | 24-54 V |
| Output Voltage, $V_{OUT}$ | 1 V |
| Output Power, $P_{OUT}$ | 40 W |
| Max Load current Step $\Delta I_{LOAD}$ | 40 A |
| Output Capacitor, COUT | 640 µF |
| Main Converter switching frequency $f_{SW,DIH}$ | 200 kHz |
| Main Converter native conversion ratio, N | 4 |
| Main Converter Inductors L1, L2 | 0.47 µH |
| Main Converter flying capacitors, C1, C2, C3 | 10 µF |
| Auxiliary Converter Switching frequency $f_{SW,ACB}$ | 2 MHZ |
| Auxiliary Converter inductor $L_{AUX}$ | 0.56 µH |

This leads to the theoretical minimum auxiliary and output capacitance of $C_{AC,min}=16.7$ µF and $C_{OUT,min}=374$ µF, respectively, although in practical designs (or even simulations), the values may be higher to take into account non-idealities such as controller delays and parasitics, assuming a maximum allowable ripple of $\Delta V_{OUT,max}=50$ mV.

Figure 9:
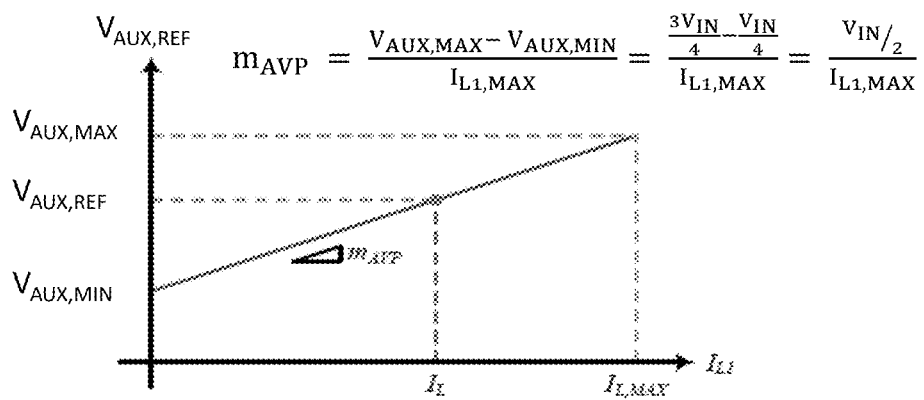
FIG. 9 shows an AVP load line.

FIG. 9 shows, schematically, the load-line based Adaptive-Voltage-Positioning (AVP) control concept. As can be seen, the reference voltage, $V_{AUX,REF}$, lies between a minimum $V_{AUX,MIN}$, and a maximum $V_{AUX,MAX}$, depending on an inductor current $I_{L1}$ (i.e. the inductor current in one of the two phases of the DIH main converter, as a measure of the load current). The slope of this dependence, $m_{AVP}$, can then be determined, since:

$$m_{AVP} = \frac{V_{AUX,MAX} - V_{AUX,MIN}}{I_{L1,MAX}} = \frac{\frac{3V_{IN}}{4} - \frac{V_{IN}}{4}}{I_{L1,MAX}} = \frac{\frac{V_{IN}}{2}}{I_{L1,MAX}} \quad (4)$$

since $V_{AUX}$ is allowed to be controlled (in this embodiment) between a target minimum of $V_{AUX,MIN}=V_{IN}/4$ and a target maximum of $V_{AUX,MAX}=3V_{IN}/4$. Put another way, the minimum value $V_{AUX,REF}$, that is to say the value when there is no load on the converter, is $V_{IN}/4$ and the maximum value of $V_{AUX,REF}$, when there is full load on the converter, is $3V_{IN}/4$. Compared to conventional uses of AVP, this allowed deviation in the reference voltage is large, so the control may be termed Extreme Adaptive-Voltage-Positioning.

The AVP circuit determines the actual value of $V_{AUX,REF}$, according to:

i.

$$V_{AUX,REF} = \left(\frac{1}{4}\right)V_{IN} + m_{AVP} \cdot I_{L1} \quad (5)$$

ii.

An effect is that, at light load ($I_{L1} \sim 0$), $C_{AUX}$ is nearly discharged (at $V_{IN}/4$). When a load transient occurs, this leaves ¾ $V_{IN}$ available to apply to the inductor in the AUX power stage when its high-side switch M8 424 is conducting, and allows its current to ramp quickly and supply load current. Conversely, at heavy load, CAUX is at ¾*$V_{IN}$, and when the load suddenly decreases, the AUX regulator can put −¾*$V_{IN}$ across its inductor when its low-side switch M7 422 is conducting—quickly absorbing excess current delivered by the main converter.

The skilled person will appreciate that AVP control allows to adjust the voltage applied across the auxiliary inductor. By doing so, control is enabled over the auxiliary inductor slew rate which determines the transient response and helps to reduce the output capacitance.

Figure 10:
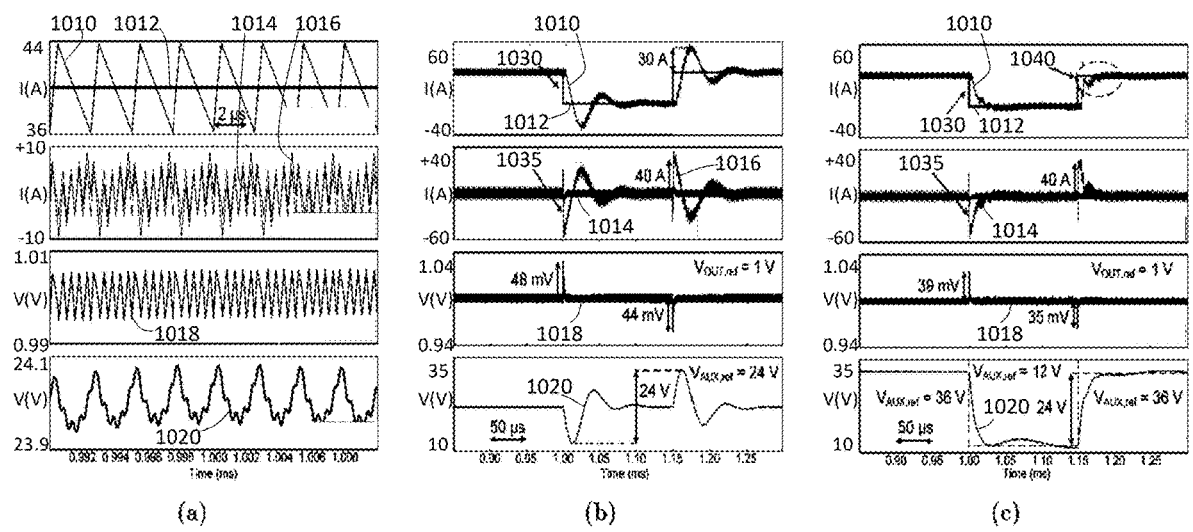
FIG. 10 shows results of dynamic response simulations.

FIG. 10 shows the results of simulations carried out to determine the dynamic response of an embodiment. In each of three scenarios, the current output $I_{MAIN}$ from the main converter is shown at 1010, the total current output $I_{LOAD}$ is shown at 1012, the output capacitor current $I_C$ at 1014, the current supplied from the auxiliary converter, $I_{AUX}$ at 1016, the output voltage $V_{OUT}$ at 1018 and finally the voltage $V_{AUX}$ on the output of the auxiliary converter at 1020. On the left-hand side of the plot, at (a), is shown the operation in steady state, in the middle group of plots, at (b), is shown the response to a 40 A load step applied as shown at 1030, when the converter is simulated to operate without AVP, and in the right-hand group of plots, at (c), is shown the response to a 40 A load step applied as shown at 1030, when the converter is simulated to operate with AVP. As can be seen, in steady state the bulk of the current and thus power is provided by the main converter. The steady-state waveforms, shown in (a), demonstrate the inherent rejection of the main-stage ripple current, $\Delta I_{MAIN}$. The output-capacitor current-based HCMC scheme observes $\Delta I_{MAIN}$ as a disturbance in $I_C$ at $2 \times f_{SW,DIH}$ and adjusts $I_{AUX}$ to reject $\Delta I_{MAIN}$. Both the middle group of plots at (b) and the right-hand group of plots at (c) show a fast ramp down of $I_{AUX}$ as illustrated at 1035. And when the AVP is applied, the peak in $I_{MAIN}$ is significantly reduced as can be seen at 1040: with $C_{OUT}=640$ μF and AVP disabled, a $\Delta V_{OUT}$ of 48 mV is observed, while $\Delta V_{AUX}=12V$ for $C_{AC}=30$ μF. With AVP enabled, $I_{AUX,rms}$ is reduced by 28%, $C_{AC}=18$ μF, and a reduction in $\Delta V_{OUT}$ of 39 mV is achieved, as shown at (c).

Figure 11:
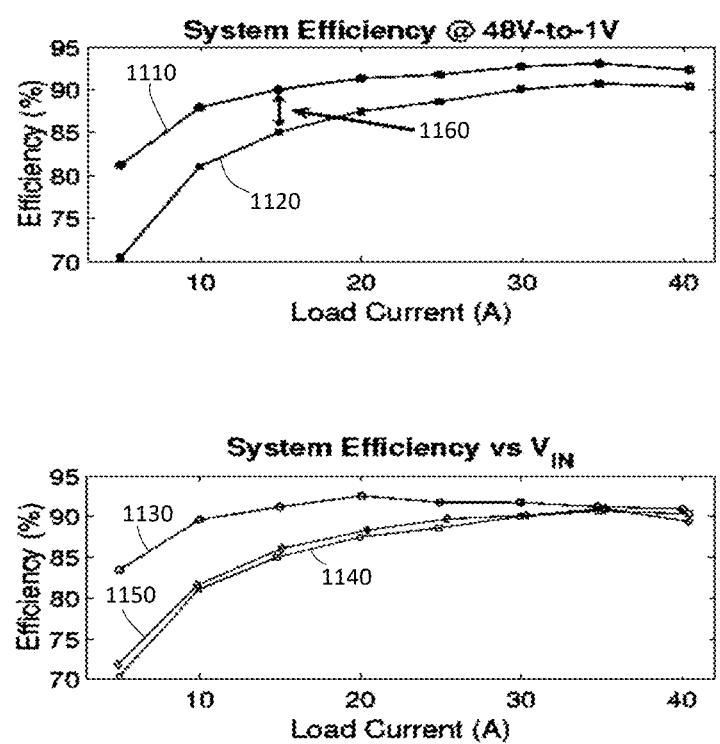
FIG. 11 shows simulations of system efficiency.

FIG. 11 shows the results of simulations of the losses of the auxiliary ACB and main DIH converters, using models of commercially available GaN Devices and MOSFETs. For M7 and M8, 100V, 6 mΩ EPC2204 GaN devices were used, while 25V, 1 mΩ BSZ010NE2LS5 and 40V, 6.3 mΩ BSZ063N04LS6 MOSFETs were used for M1 & M2, and M3, M4, M5 and M6, respectively. The simulated system efficiency is shown in the top plots of FIG. 11 excluding the efficiency penalty arising from losses in the auxiliary converter (at 1110) and including that efficiency penalty (at 1120). The penalty is larger at lower load (such as 5% at a current of 15 A, as seen at 1160). The efficiency versus $V_{IN}$ is shown the bottom plots. Plot 1130 shows the response for the value of $V_{IN}$ of 24 V, 1140 shows the efficiency for 48V and 1150 shows a response for 54V. A peak simulated efficiency of 92.6% is achieved at $V_{IN}=24V$ while an efficiency of 90.4% is achieved at the rated load and the nominal 48V-to-1V conversion ratio.

The skilled person will appreciate the present disclosure is not constrained to use (E)AVP. Without AVP, the system can also work. However, as the example above shows, utilising AVP on $V_{AUX}$ may in some embodiments result in a significant improvement (for instance by enabling a significant reduction in $C_{AC}$) and may therefore be preferred in some embodiments.

In the topology illustrated in FIG. 2 and FIG. 3, $V_{IN}$ is used for both the main converter and the auxiliary converter. However, as already mentioned above, the present disclosure is not limited thereto, and in particular, the auxiliary converter may also be able to, or be configured to, operate from a lower or separate $V_{IN}$, such as a supply voltage which may be present elsewhere in the system, (e.g. 5V), or even from a voltage tapped from the lowest voltage on a flying capacitor in the main converter in embodiments in which that is implemented as a hybrid stage. It will be appreciated that when operating from a lower $V_{IN}$, using regular Si devices for the auxiliary converter may be possible, which may provide an additional cost advantage.

Furthermore, it will be appreciated that variations of the control methods of both main and auxiliary converters can readily be envisioned, and are included within the scope of the present disclosure. The above description has been based on the hysteretic current-mode control of the auxiliary converter, and basing it on the capacitor current may be beneficial for, or particularly suited to, fast transient response, but the disclosure is not limited thereto.

Yet further, although it will be appreciated that, to achieve maximum benefit the auxiliary converter needs to remain operational since it controls the output voltage, the switching frequency may be variable. For example, based on information of the oncoming transients, the switching frequency of the auxiliary converter could potentially be lowered or even halted when no significant load transients are expected to optimize overall system efficiency further.

In general terms, it has been disclosed that the switching frequencies of the main and auxiliary converters may be individually optimized to optimize overall system efficiency and transient response, respectively. The fact that the auxiliary converter controls the output voltage of the main converter, while the main converter controls the output voltage of the auxiliary converter, and the fact that applying AVP on the auxiliary output voltage (instead of the output voltage as is done in state-of-the-art PoL converters) may give significant benefits in reducing the overall Bill of Materials further.

Although embodiments have been described above implementing buck converters, the disclosure is not limited thereto. Embodiments may relate to a step up requirements and implement boost converters. In particular, one or more embodiments may be useful for applications in which $V_{OUT}$ is required which is slightly higher than $V_{IN}$ (and in particular 0.8V above it, in which case the same slew-rate limitations as $V_{OUT}$=0.8V as for a buck). In such embodiments, the auxiliary (boost) converter would also be connected to $V_{OUT}$ via an AC coupling capacitor (but the coupling should be switchable, in order that that connection is only made if the high-side switch is on: first $L_{AUX}$ is energized between $V_{IN}$ and GND via the low-side switch, then it is connected between $V_{IN}$ and $V_{OUT}$, where $V_{AC}$ is connected in series for additional voltage across $L_{AUX}$). The downward slew rate of the auxiliary converter is determined by ($V_{IN}$-$V_{OUT}$-$V_{AC}$) instead of $V_{IN}$-$V_{OUT}$ (the latter difference being only 0.8V in this example).

From reading the present disclosure, other variations and modifications will be apparent to the skilled person. Such variations and modifications may involve equivalent and other features which are already known in the art of point of a DC-DC converters and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

LIST OF REFERENCE SIGNS

100 DC-DC converter architecture
110 main converter
112 primary DC power delivery
115 main converter output
120 auxiliary converter
122 $V_{OUT}$ regulation
125 auxiliary converter output
130 DC power supply
140 Load
150 output Capacitor
160 auxiliary converter output coupling capacitor
210 main converter control
220 auxiliary converter control
310 auxiliary converter control
320 main converter control
410 4:1 dual-inductor hybrid converter
412 flying capacitor C1
414 flying capacitor C2
416 flying capacitor C3
420 AC-coupled Buck (ACB) converter stage
422 switch M7
424 switch M8
426 switch node
428 inductor
481, 482 . . . 486 switch M1, M2 . . . M6
487 first inductor L1
488 second inductor L2
489 first switch node $V_{SW1}$
490 second switch node $V_{SW2}$
510 charge/discharge State
511, 512 . . . 516 status of M1, M2 . . . M6
522 first switch node voltage $V_{SW1}$
524 second switch node voltage $V_{SW2}$
610 controller
620 first control circuit
630 second control circuit
640 controller output signals
650 controller output signals
670 voltage $V_{AUX}$ sensing
680 voltage $V_{OUT}$ sensing current $I_{MAIN}$ output
685 current $I_{MAIN}$ sensing
690 $V_{IN}$ input to first control circuit
722 PID unit
724 switch pattern generator
726, 728 delay timer
732 PI integrator
734 hysteretic controller
736 SR flip-flop
738 delay timer
740 AVP control subcircuit
802 load change
804 load change
812 $V_{OUT}$ transient
814 $V_{OUT}$ transient
822 restoration charge transfer $I_{AUX,rms}$
824 restoration charge transfer $I_{AUX,rms}$
832 peak current $I_{MAIN,pk}$
852 load step with AVP
852 load step with AVP
862 $V_{OUT}$ transient with AVP
864 $V_{OUT}$ transient with AVP
872 reduced restoration charge transfer $I_{AUX,rms}$ under AVP
874 reduced restoration charge transfer $I_{AUX,rms}$ under AVP
882 peak current $I_{MAIN,pk}$ with AVP
1010 main converter current output $I_{MAIN}$
1012 total current output $I_{LOAD}$
1014 output capacitor current $I_C$
1016 auxiliary converter current $I_{AUX}$
1018 output voltage $V_{OUT}$
1020 auxiliary converter output voltage $V_{AUX}$
1030 load step
1040 peak in $I_{MAIN}$
1110 system efficiency
1120 system efficiency including Auxiliary losses
1130 response for $V_{IN}$=24V
1140 response for $V_{IN}$=48V
1150 response for $V_{IN}$=54V
1160 efficiency penalty from Auxiliary losses

What is claimed is:
1. A controller for a power converter having a main converter connected between a first input voltage (VIN) and a ground and having a main output at a main output terminal, an auxiliary converter connected between a second input voltage ("VIN") and the ground and having an auxiliary output (AUX), an output capacitor (COUT) connected between the main output terminal and the ground, and an auxiliary capacitor (CAUX) connected between the auxiliary output and the main output terminal;

the controller comprising:
a first control circuit configured to operate the main converter at a first frequency,
a second control circuit configured to operate the auxiliary converter at a second frequency;
the first control circuit being further configured to operate the main converter to control the voltage at the auxiliary output; and
the second control circuit being further configured to operate the auxiliary converter to control the voltage at the main output terminal;
wherein the main converter is configured to dynamically configure a slew rate of an auxiliary inductor current of the inductor based on a load current at the main output terminal.

2. The controller of claim 1, wherein the second input voltage is equal to the first input voltage.

3. The controller of claim 1, wherein the second frequency is higher than the first frequency.

4. The controller of claim 1, wherein the second frequency is variable.

5. The controller of claim 1, wherein the first control circuit comprises an adaptive-voltage-positioning control (AVP) subcircuit.

6. The controller of claim 5, where the AVP subcircuit is configured to measure a current output from the main converter, and adapt an auxiliary reference voltage output in dependence on the current output, and the first control circuit is configured to control the voltage at the auxiliary output to the adapted auxiliary reference voltage.

7. The controller of claim 5, where the AVP subcircuit is configured to measure a current through an inductor in the main converter, and to adapt an auxiliary reference voltage output in dependence on the current through the inductor, and the first control circuit is configured to control the voltage at the auxiliary output to the adapted auxiliary reference voltage.

8. The controller of claim 1, wherein the second controller is configured to use hysteretic control to control the voltage at the main output.

9. The controller of claim 1, wherein the second control circuit is configured to:
determine an error between the voltage at the main output and a reference output voltage,
and control switches in the auxiliary converter to minimize the error.

10. The controller of claim 9, wherein the auxiliary converter is an AC-coupled converter.

11. The controller of claim 10, wherein the AC-coupled buck converter comprises a pair of switches connected in series between the second input voltage and the ground and having a node therebetween, and an inductor connected between the node and the auxiliary output.

12. The controller of claim 1, wherein the main converter is a dual-inductor hybrid converter.

13. The controller of claim 1, wherein:
the auxiliary converter comprises an inductor coupled between a switched node and the auxiliary output; and
controlling the main converter to control the voltage at the auxiliary output comprises controlling a slew rate of an auxiliary inductor current of the inductor.

14. The controller of claim 13, wherein the output capacitor is larger than the auxiliary capacitor.

15. A method of controlling a power converter having a main converter connected between a first input voltage and a ground and having a main output at a main output terminal, an auxiliary converter connected between a second input voltage and the ground and having an auxiliary output, an output capacitor connected between the main output terminal and a ground, and an auxiliary capacitor connected between the auxiliary output and the main output terminal; and a controller;

the method comprising:
operating the main converter at a first frequency,
operating the auxiliary converter at a second frequency;
controlling the main converter to control a voltage at the auxiliary output; and
controlling the auxiliary converter to control a voltage at the main output terminal;
wherein:
the auxiliary converter comprises an inductor coupled between a switched node and the auxiliary output; and
controlling the main converter to control the voltage at the auxiliary output comprises controlling a slew rate of an auxiliary inductor current of the inductor.

16. The method of claim 15, wherein controlling the main converter to control the voltage at the auxiliary output comprises adaptive-voltage-positioning control (AVP).

17. The method of claim 15, wherein controlling the voltage of at the auxiliary output optimizes a transient response of the auxiliary converter.

18. The method of claim 15, wherein the output capacitor is larger than the auxiliary capacitor.

19. The method of claim 15, further comprising:
determining an error based on a difference between the voltage at the main output and a reference output voltage, and
controlling switches in the auxiliary converter to minimize the error.

20. The method of claim 15, further comprising:
measuring a current output from the main converter;
adapting an auxiliary reference voltage output in dependence on the current output; and
controlling the voltage at the auxiliary output based on the adapted auxiliary reference voltage.

\* \* \* \* \*